Nov. 29, 1960     F. Z. PIRKEY     2,962,599
APPARATUS FOR DEVELOPING AND ACCUMULATING
HYDROELECTRIC ENERGY

Filed Sept. 9, 1957     2 Sheets-Sheet 1

INVENTOR.
FRANK Z. PIRKEY
BY *Lothrop & West*
ATTORNEYS

Nov. 29, 1960    F. Z. PIRKEY    2,962,599
APPARATUS FOR DEVELOPING AND ACCUMULATING
HYDROELECTRIC ENERGY
Filed Sept. 9, 1957    2 Sheets-Sheet 2

INVENTOR.
FRANK Z. PIRKEY
BY Lothrop & West
ATTORNEYS

United States Patent Office 2,962,599
Patented Nov. 29, 1960

2,962,599

APPARATUS FOR DEVELOPING AND ACCUMULATING HYDROELECTRIC ENERGY

Frank Z. Pirkey, 3221 Mountain View, Sacramento 21, Calif.

Filed Sept. 9, 1957, Ser. No. 682,811

3 Claims. (Cl. 290—4)

The invention relates to an improved apparatus for developing hydroelectric power during peak-load periods and accumulating energy during off-load periods, and, more particularly, to a method of and apparatus for integrating such a system into the planned development of a watershed located at a distance from the electrical energy load.

So-called pump storage systems have previously been installed in the United States, ordinarily at low heads, under immediate human supervision and in conjunction with reservoirs of large capacity. Comparable systems are known in other parts of the world, some of the foreign installations involving intermediate to high heads, and even under conditions of automatic or remote control; these systems, however, in common with installations in the United States have utilized large and costly reservoirs.

It is therefore an object of the invention to provide apparatus for developing and accumulating energy which obviates the necessity for large and expensive dams.

It is another object of the invention to provide a power leveling system which particularly lends itself for use in watersheds providing high heads of water.

It is still another object of the invention to provide a system which permits of progressive and self-liquidating development of mountainous river basins.

It is yet another object of the invention to provide a system which is relatively economical to put into operation, and which entails but a minimum of operating expense.

It is a further object of the invention to provide a power developing and energy accumulating system which is admirably adapted for integration not only with existing fossil fuel plants but also with atomic energy plants.

It is yet a further object of the invention to provide a system which, while promoting the development of a watershed, does not substantially interfere with the requirements of conservation and recreation in such areas.

It is still a further object of the invention to provide a system which not only is easily and advantageously integrated with power networks, but which is fully compatible with large foothill line reservoirs, where such reservoirs are required for such purposes as flood control and navigation.

It is yet another object of the invention to provide a system which can be financed and constructed in relatively small economical units or increments, each of which, upon eventual total development of a watershed, can be linked together to form an efficient whole.

It is another object of the invention to provide a generally improved apparatus for developing and accumulating hydroelectric energy, and of integrating into a transmission net the means and process for converting and reconverting electrical energy from and into dynamic and potential status.

Other objects, together with the foregoing, are attained in the embodiments described in the following description and shown in the accompanying drawings in which.

Figure 1:
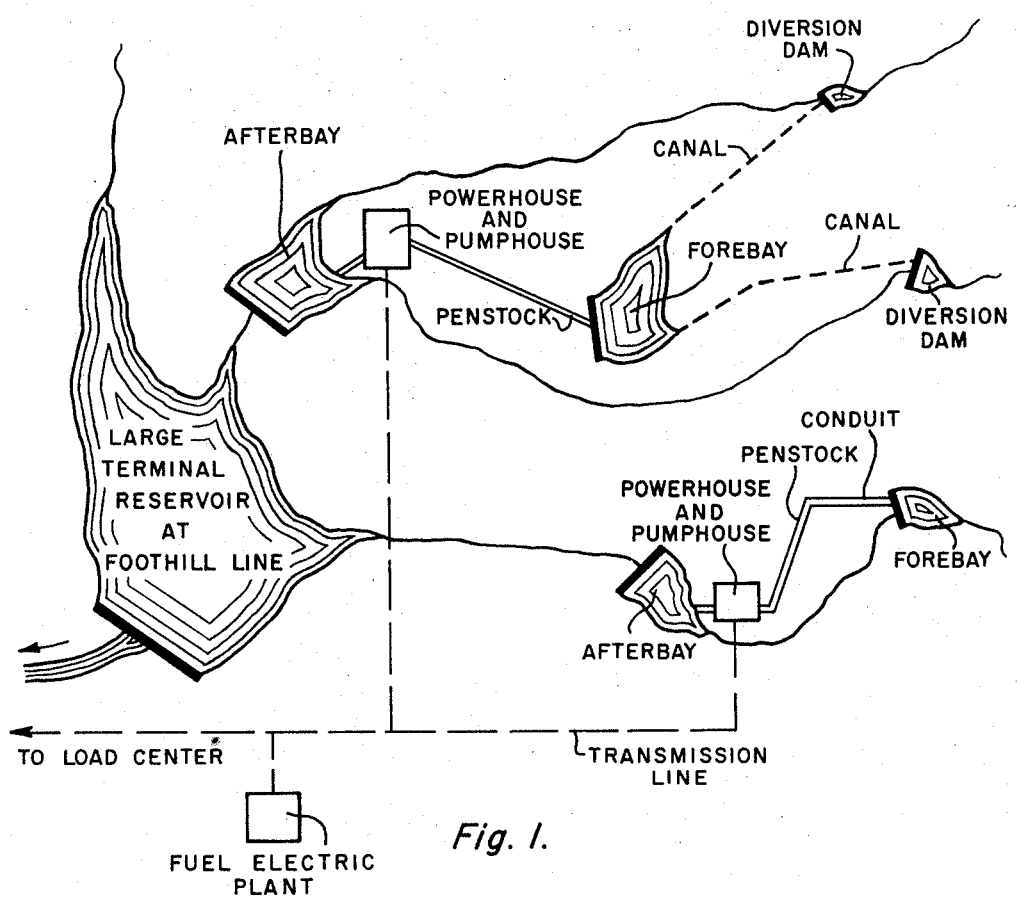
Figure 1 is a plan, in semi-diagrammatic fashion, of a simplified developed watershed area, the scale being distorted more clearly to illustrate the system.

There are in existence numerous undeveloped or partially developed hydraulic power sites in which the source of power comprises a stream of water having substantially constant available head but a more or less variable rate of flow.

In the usual hydroelectric installation dependability is required to insure the ability to furnish a minimum reliable amount of power in any day of any year including the driest or lowest flow day of any year or period of years. The power generating ability of this minimum day is termed the dependable capacity of the power plant, and is measured in kilowatts. The actual installed capacity is usually substantially greater than the dependable capacity.

On many streams the flow is variable, requiring large reservoir storage capacity to carry over the dry years and insure the largest practicable flow in the driest period, thus to maintain the dependable generating capacity. On many streams this required large storage capacity is not available or is excessively costly; limiting the practicable economic development of the stream for hydroelectric power, since the value of hydroelectric power produced depends largely on the dependable kilowatts of generating capacity. Where the dependable hydroelectric kilowatt capacity is low, steam support or additional kilowatt capacity of a fuel electric plant is required to maintain dependability. The fuel electric supporting capacity may utilize many kinds of fuel such as coal, oil, atomic fuel, etc.

Dependable capacity, therefore, under present methods, requires large reservoir capacity or steam support, or a combination of both in some proportion, usually resulting in under development of hydroelectric potential and over development of steam capacity.

This undesirable situation may be improved to a large extent by means of pumped storage. Pumped storage requires an afterbay to store a suitable quantity of water discharged from the hydroelectric power plant and a pump prime mover combination to pump the water from the afterbay back to the forebay.

The present invention contemplates provision of a method and means of utilizing pumped storage to eliminate the necessity of large reservoir storage capacity in connection with hydroelectric development, improved machinery to accomplish this result, reduction in the required amount of fuel electric support and mutual benefit and encouragement to the concurrent development of hydroelectric and fuel electric power, particularly atomic power.

In most power nets today there exists a large potential but un-used fuel electric generating capacity. This off-peak capacity is available usually during the night, and on holidays and weekends. Electric off-peak energy during these periods may be utilized at reduced rates to pump water from an afterbay of a hydroelectric plant to the forebay for generation of power during the daytime or on-peak. The storage capacity required in either the forebay or afterbay is no greater than that required for the conventional peaking hydroelectric plant. It a day's supply of water be defined as that flowing downward in the penstock for ten hours at full generating capacity, then the capacity required for the forebay and likewise for the afterbay is three to five days' supply so that pumping may be done on a weekend of two days followed by a holiday or a total of three days. Under the present invention no other reservoir capacity on the stream is required for dependable generation of hydroelectric power.

In other words pumped storage is combined with run of river variable flow, utilizing off-peak energy, thereby eliminating large reservoir storage capacity now required. Utilization of off-peak energy from the power net permits continuous operation of fuel electric plants and utilization of otherwise idle capacity. Both fuel electric and hydroelectric plants are in continuous operation providing the greatest utilization of all installed capacity; resulting in substantial overall economy. This economy will be particularly noted in the case of atomic plants with relatively large capital investment and low fuel costs.

Figure 1 illustrates to a considerably distorted scale, a segment of a typical watershed area, the water draining in a general left-hand direction. Total development of a river basin frequently contemplates, particularly in the Western regions of the United States, a large terminal reservoir located at the foothill line, that is to say, at the approximate elevation where the river disgorges from the foothills into a valley or plain. The method of the invention is altogether compatible with a large terminal reservoir of this nature and such a reservoir is therefore illustrated.

Farther upstream, the river is forked, in the usual case, and the gradient of the component streams ordinarily increases. Exhaustive surveys, accompanied by engineering economic studies and considerations of population distribution and land uses, determine along with histories of stream flows, the placement and sizes of the various installations.

In Figure 1, the forebays and afterbays are shown to a greatly exaggerated scale, for purposes of clarity. Under actual conditions, the forebays and afterbays may each have a capacity one one-thousandth that of the terminal reservoir, or even considerably less.

The forebay may be located on or adjacent the stream bed, as indicated in the lower right hand portion of Figure 1; on the other hand, the forebay may, depending on engineering economic studies, be more properly located distant from the stream, as, for example, in a natural depression disposed approximately half-way between two streams and fed by suitable canals leading from diversion dams on the streams. This situation is indicated in the upper, right-hand portion of Figure 1. In any event, both of the units could be constructed at the same tme, or one could be installed several years before the other to meet the requirements of a local situation, without derogating from the value of the other. Overall initial planning, however, is of considerable importance for most efficient utilization of an entire watershed or group of watersheds.

Interposed between each of the forebays and afterbays, is a plant housing a pump turbine, motor generator unit. In remote areas, appropriate automatic controls can be installed to effect the required results, with consequent reduction in operating costs and the utilization of suitable remote sites not otherwise usable.

Power transmission lines are linked to a net served by fuel electric plants.

Figure 2:
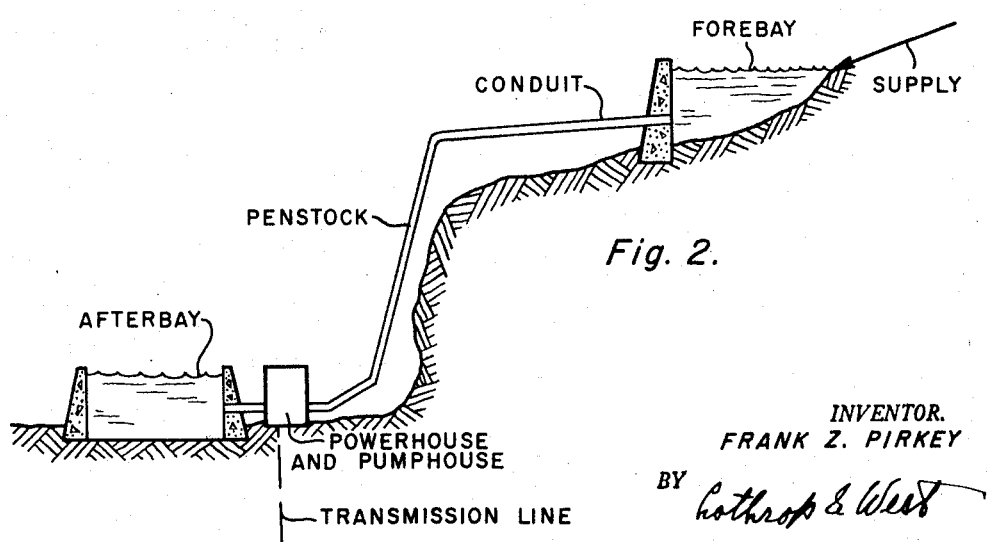
Figure 2 is a side elevation, to a distorted scale, of the lower right-hand installation shown in Figure 1.

As appears most clearly in Figure 2, water from a forebay is directed, during peak periods, through a conduit leading to a penstock. While traversing the penstock in a downward direction, potential energy is converted to dynamic energy, the water rotating the turbine, producing electrical energy available at the generator, the water thereafter discharging from the turbine and into the afterbay.

The reverse of this procedure obtains during off-peak periods. Electrical energy from the net is utilized to rotate the pump, water from the afterbay being pumped upwardly through the penstock and into the forebay.

Previous installations in this country and abroad, so far as is known, have either utilized separate pump and turbine mechanisms, or where combined, have had difficulty with shock, or water hammer, in the event of flow reversal, especially where high head is involved. To circumvent this trouble, some installations have, after shutting off flow completely, withdrawn the water present in the turbine or pump mechanism and attendant conduits, before commencing flow in the opposite direction.

Not only is such an undertaking avoided in the apparatus of the present invention, thereby permitting of rapid flow reversal, but the pump and turbine are combined in one unit, the direction of fluid flow within the unit always being in one direction.

Figure 3:
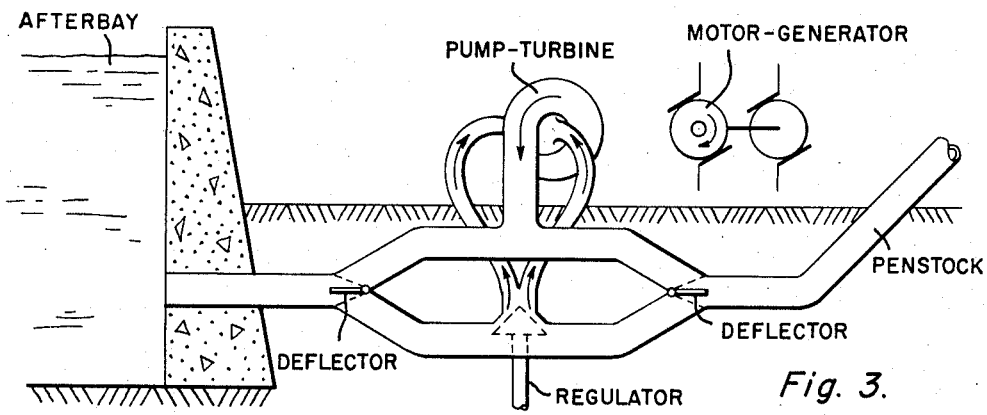
Figure 3 is a side elevation, in semi-schematic form, of a pump turbine installation showing the deflectors in an intermediate attitude.
Figure 4:
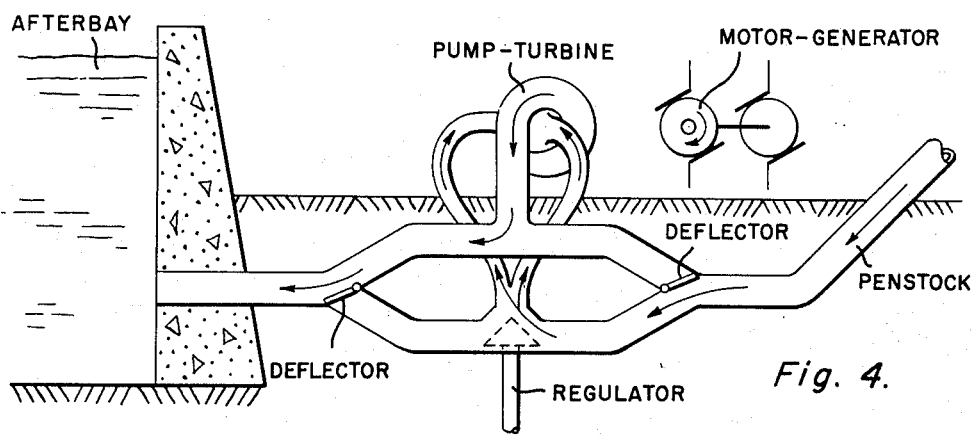
Figure 4 is a view comparable to that of Figure 3, but showing the deflectors in the attitude assumed during power generation.
Figure 5:
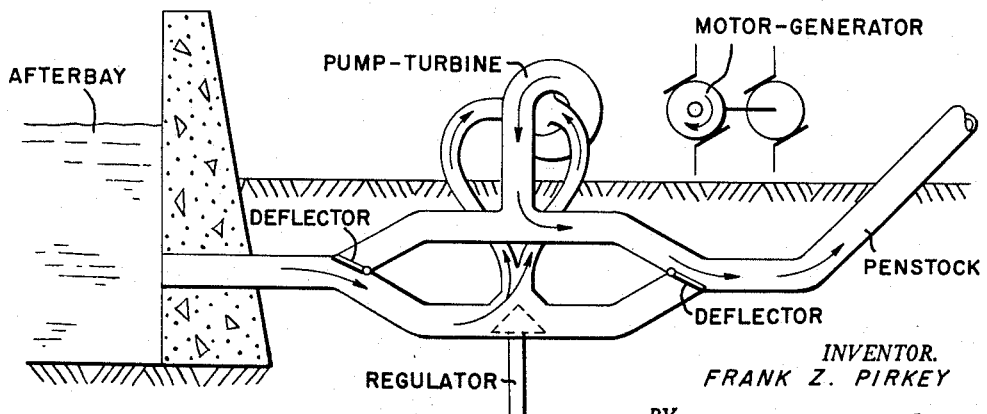
Figure 5 is a comparable showing but with the deflectors in the attitude assumed during energy accumulation.

As shown most clearly in Figures 3 through 5, fluid motion is reversed by suitable orientation of a pair of deflectors, each disposed at the junction of a pair of pipe branches disposed in parallel relation.

During power generation, as appears most clearly in Figure 4, the deflectors are so oriented that water from the penstock is diverted through an orifice, whose size is governed by the regulator, into a branching pair of conduits leading to both sides of the pump-turbine. The opposing entry substantially eliminates side-thrust. Rotation of the turbine, and associated generator, in the clockwise direction indicated is thereupon effected, the "spent" water discharging from the scroll and into the afterbay.

Figure 5, on the other hand, illustrates the procedure followed during off-peak hours, and resulting in energy accumulation by virtue of the additional head given to a predetermined quantity of fluid in moving said fluid from the afterbay to the forebay. The deflectors are so oriented that as the motor (and the attendant pump) is rotated, again in a clockwise direction, water from the afterbay is impelled outwardly from the pump scroll and upwardly through the penstock to the elevated forebay, there to await reversal of the process during load peaks.

While Figures 3–5 are, to a considerable extent, diagrammatic, they illustrate uni-rotational structure both as to the pump-turbine and the motor-generator units. Additionally flow regulating mechanism and side thrust eliminating structure is shown. Motor-generator units are, of course, well known in the art. With respect to the pump-turbine device, it is believed that an impeller or rotor having a plurality of vanes, each with a front face contour and a rear face contour, each appropriately designed for use as a pump and a turbine, respectively, could be utilized. Multi-staging is similarly contemplated and would in all probability be used where high heads are involved. It is realized, furthermore, that the pump-turbine unit can also be mounted with a vertical axis of rotation and could be of the single entry type.

It can therefore be seen that the apparatus of the invention provides a considerable number of novel features and lends itself with especial advantage to economical development of watersheds, even where piece-meal development is necessary, and particularly to integration with nets incorporating plants of the atomic fuel variety. While large terminal reservoirs can and often advantageously would be used in conjunction with the invention for example, for flood control and recreation, one of the principal advantages of the invention is that large and costly dams are not essential to its highly effective and economic operation.

What is claimed is:

1. An apparatus for use in a pump turbine system including an afterbay and a penstock, said apparatus comprising a first conduit connected to said afterbay, a second conduit connected to said penstock, a first branch connected to said first conduit and said second conduit, a second branch connected to said first conduit and said second conduit, a pump turbine feed line connected to said second branch, a pump turbine discharge line connected to said first branch, means for simultaneously deflecting fluid from said penstock through said second branch and through said feed line and for deflecting fluid through said discharge line through said first branch and into said afterbay.

2. The apparatus of claim 1 further characterized by means for substantially simultaneously rendering inoperative said deflecting means and for guiding fluid from said afterbay into said feed line and for guiding fluid from said discharge line into said penstock, whereby the direction of flow in said feed line is uniformly in one direction and the direction of flow in said discharge line is uniformly in the other direction.

3. A pump turbine house comprising a pump turbine, a motor generator set connected to said pump turbine, a penstock, an afterbay, means for directing fluid from said penstock into said pump turbine to cause rotation thereof in a predetermined direction of rotation whereby electrical energy is generated by said motor generator set, means for guiding fluid from said afterbay into said pump turbine to be pumped thereby into said penstock by said pump turbine while rotating said pump turbine in said same predetermined direction of rotation whereby electrical energy is absorbed by said motor generator set, means for supplying electrical energy to said motor generator set from an external source whereby said pump turbine is rotated in said predetermined direction of rotation and whereby fluid is urged from said afterbay through said pump turbine and into said penstock, and remote means for rendering operative said fluid directing means and said fluid guiding means in alternate fashion.

References Cited in the file of this patent

UNITED STATES PATENTS

| 1,494,008 | Nagler | May 13, 1924 |
| 1,813,107 | Allner | July 7, 1931 |
| 1,921,905 | Blom | Aug. 8, 1933 |
| 1,941,845 | Lell | June 2, 1934 |

OTHER REFERENCES

Civil Engineering, July 1931, pp. 395 to 398.